(12) United States Patent
Overbeeke et al.

(10) Patent No.: US 12,527,503 B2
(45) Date of Patent: Jan. 20, 2026

(54) CANNULA INSERTION SYSTEM

(71) Applicant: Vitestro Holding B.V., Utrecht (NL)

(72) Inventors: Toon Olaf Overbeeke, Utrecht (NL);
Brian Robert Joseph, 'S-Gravenhage (NL); Johannes Gerhard Daniël Karssen, Utrecht (NL); Arris Cornelis Jonker, Utrecht (NL)

(73) Assignee: Vitestro Holding B.V., Utrecht (NL)

( * ) Notice: Subject to any disclaimer, the term of this patent is extended or adjusted under 35 U.S.C. 154(b) by 994 days.

(21) Appl. No.: 17/421,045

(22) PCT Filed: Jan. 7, 2020

(86) PCT No.: PCT/NL2020/050009
§ 371 (c)(1),
(2) Date: Jul. 7, 2021

(87) PCT Pub. No.: WO2020/145821
PCT Pub. Date: Jul. 16, 2020

(65) Prior Publication Data
US 2022/0054062 A1 Feb. 24, 2022

(30) Foreign Application Priority Data

Jan. 7, 2019 (NL) ..................... 2022350

(51) Int. Cl.
*A61B 5/15* (2006.01)
*A61B 5/00* (2006.01)
*A61B 90/00* (2016.01)

(52) U.S. Cl.
CPC .... *A61B 5/150648* (2013.01); *A61B 5/15003* (2013.01); *A61B 5/150389* (2013.01);
(Continued)

(58) Field of Classification Search
CPC .......... A61B 5/150648; A61B 5/15003; A61B 5/150389; A61B 5/150748; A61B 5/489;
(Continued)

(56) References Cited

U.S. PATENT DOCUMENTS 5,616,135 A * 4/1997 Thorne ............ A61B 5/150305
604/263
8,308,741 B2 11/2012 Hyde et al.
(Continued)

FOREIGN PATENT DOCUMENTS

CN 104605865 A 5/2015
CN 106580344 A 4/2017
(Continued)

OTHER PUBLICATIONS

International Search Report and Written Opinion mailed Mar. 26, 2020, International Application No. PCT/NL2020/050009, 10 pages.
(Continued)

*Primary Examiner* — Jennifer Robertson
*Assistant Examiner* — Nidhi N Patel
(74) *Attorney, Agent, or Firm* — FORTEM IP LLP (57) ABSTRACT

A cannula insertion system for inserting a cannula into a human or animal body, includes a cannula and a cannula insertion device to hold and insert the cannula into the human or animal body in an insertion direction. The cannula insertion system includes a safety device configured to retract the cannula or to release the cannula from the cannula insertion device when a force exerted on the cannula in a direction perpendicular

19 Claims, 7 Drawing Sheets

(52) U.S. Cl.
CPC ........ *A61B 5/150748* (2013.01); *A61B 5/489* (2013.01); *A61B 90/06* (2016.02); *A61B 2090/062* (2016.02); *A61B 2090/065* (2016.02); *A61B 2090/378* (2016.02)

(58) Field of Classification Search
CPC ....... A61B 5/3287; A61B 5/46; A61B 5/0053; A61B 2090/062; A61B 2090/065; A61B 2090/378; A61B 34/20; A61B 34/30; A61B 2017/3409; A61B 2017/3413; A51B 90/06; A51B 90/10; A51B 90/11; A61M 5/427

See application file for complete search history.

(56) References Cited

U.S. PATENT DOCUMENTS

| | | |
|---|---|---|
| 8,888,714 B1 | 11/2014 | Soto |
| 9,364,171 B2 | 6/2016 | Harris et al. |
| 9,743,875 B2 | 8/2017 | Maguire et al. |
| 9,913,605 B2 | 3/2018 | Harris et al. |
| 10,238,327 B2 | 3/2019 | Harris et al. |
| 10,555,696 B2 | 2/2020 | Breteau et al. |
| 11,224,369 B2 | 1/2022 | Harris et al. |
| 2005/0020921 A1 | 1/2005 | Glassell et al. |
| 2005/0074407 A1 | 4/2005 | Smith |
| 2006/0122555 A1* | 6/2006 | Hochman ............ A61M 5/1723 604/67 |
| 2007/0088346 A1 | 4/2007 | Mirizzi et al. |
| 2008/0195043 A1 | 8/2008 | Schwach et al. |
| 2008/0275396 A1 | 11/2008 | Neerken et al. |
| 2009/0118670 A1 | 5/2009 | Neerken et al. |
| 2009/0216204 A1 | 8/2009 | Bhavaraju et al. |
| 2009/0275823 A1 | 11/2009 | Ayati et al. |
| 2011/0166451 A1 | 7/2011 | Blaivas et al. |
| 2011/0301500 A1 | 12/2011 | Maguire et al. |
| 2012/0259220 A1 | 10/2012 | Sheldon et al. |
| 2013/0035591 A1 | 2/2013 | Hyde et al. |
| 2013/0041253 A1 | 2/2013 | Hyde et al. |
| 2015/0045729 A1* | 2/2015 | Denzer ................ A61J 1/065 604/110 |
| 2015/0065916 A1 | 3/2015 | Maguire et al. |
| 2017/0028142 A1 | 2/2017 | Song et al. |
| 2017/0278427 A1 | 9/2017 | Karssen et al. |
| 2017/0296148 A1 | 10/2017 | Niemiec et al. |
| 2018/0161519 A1* | 6/2018 | Browka .............. A61M 5/3243 |
| 2018/0193598 A1 | 7/2018 | Sarkar et al. |
| 2019/0357828 A1 | 11/2019 | Harris et al. |
| 2021/0267540 A1 | 9/2021 | Overbeeke et al. |
| 2021/0378627 A1 | 12/2021 | Yarmush et al. |
| 2022/0167892 A1 | 6/2022 | Harris et al. |
| 2022/0354399 A1 | 11/2022 | Overbeeke et al. |

FOREIGN PATENT DOCUMENTS

| | | |
|---|---|---|
| CN | 113081276 A | 7/2021 |
| EP | 2654593 A0 | 10/2013 |
| EP | 2749303 A1 | 7/2014 |
| EP | 3145409 A1 | 3/2017 |
| EP | 3831303 A1 | 6/2021 |
| EP | 3928699 A1 | 12/2021 |
| IN | 112604094 A | 4/2021 |
| WO | 00/56213 A1 | 9/2000 |
| WO | 2006120619 A2 | 11/2006 |
| WO | 2006131881 A1 | 12/2006 |
| WO | 2012088471 A1 | 6/2012 |
| WO | 2015179505 A1 | 11/2015 |
| WO | 2017/145141 A1 | 8/2017 |
| WO | 2020017965 A1 | 1/2020 |
| WO | 2020145821 A1 | 7/2020 |
| WO | 2020017965 A9 | 1/2021 |
| WO | 2022090201 A1 | 5/2022 |

OTHER PUBLICATIONS

Balter, Max Loeb, "Robotic Devices for Automated Venipuncture and Diagnostic Blood Analysis", Dissertation submitted to the Graduate School—New Brunswick, Rutgers, The State University of New Jersey, May 2017, 298 pages.

Chen, Alvin I., "Image-Guided Robotics for Autonomous Venipuncture", Dissertation submitted to the Graduate School—New Brunswick, Rutgers, the State University of New Jersey, Oct. 2016, 272 pages.

Paquit, Vincent, et al., "Combining near-infrared illuminants to optimize venous imaging", Proc. SPIE 6509, Medical Imaging 2007: Visualization and Image-Guided Procedures, Mar. 21, 2007, 10 pages.

Paquit, Vincent C., et al., "Near-infrared imaging and structured light ranging for automatic catheter insertion", Proceedings of SPIE—The International Society for Optical Engineering, Mar. 2006, 10 pages.

* cited by examiner

CANNULA INSERTION SYSTEM

CROSS-REFERENCE TO RELATED APPLICATIONS

This application is the National Stage of International Application No. PCT/NL2020/050009, filed Jan. 7, 2020, which claims the benefit of Netherlands Application No. 2022350, filed Jan. 7, 2019, the contents of which is incorporated by reference herein.

FIELD OF THE INVENTION

The present invention relates to a cannula insertion system for inserting a cannula into a human or animal body.

BACKGROUND OF THE INVENTION

US2008/0275396 A1 discloses an automated cannula insertion system for autonomously inserting a cannula into a blood vessel of a human or an animal, the contents of which are herein incorporated by reference in its entirety.

The cannula insertion system of US2008/0275396 A1 comprises an acquisition module that allows for determining at least a location of a blood vessel underneath the skin and is enabled to determine a puncture location that is suitable for inserting a cannula into the blood vessel. The cannula insertion system comprises an actuator for moving and aligning the cannula to a determined position and to autonomously insert the cannula into the blood vessel for multiple purposes, such as blood withdrawal, venous medication and infusions.

It is necessary that an automated cannula insertion system for autonomously inserting a cannula into a human or animal body, for example into a blood vessel of a human or an animal, is safely operated. When a needle is inserted into a blood vessel, unnecessary damage to the blood vessel and the tissues surrounding the blood vessel should be avoided. Moreover, since the insertion of the cannula into the blood vessel may be performed completely automatically, an operator of the cannula insertion system may not or not timely react to any malfunctioning of the cannula insertion system which may introduce a practical risk to the use of an automated cannula insertion system.

WO 00/56213 A1 discloses a locating and insertion device configured to locate a vein and introduce a needle into the vein. During insertion of the needle into a body the pressure exerted in axial direction on the vein is monitored by a pressure sensor. Penetration of the vessel wall is determined by a force-dip in the force-displacement profile of the needle penetration. When this force-dip is detected by the locating and insertion device, further insertion of the needle is stopped since the needle has penetrated the vessel wall. No safety device has been described in WO 00/56213.

US 2015/0065916 A1 discloses a fully automated vascular imaging and access system to insert a needle into a vein of a patient. In this system also, a pressure sensor is used to measure the axial pressure on the needle and to stop the needle insertion when a change in the applied force indicates a penetration of the vessel wall.

WO2017/145141 A1 discloses a system and device for detecting blood vessels. The system comprises a force sensor for measuring an axial force on the needle. Insertion of the needle is stopped when a raise in the force measured by the force sensor is determined in order to avoid penetration of the blood vessel.

SUMMARY OF THE INVENTION

An object of the present invention is to provide a cannula insertion system that improves the safety during the introduction of a cannula into a human or animal body, for example a blood vessel of a human or animal, whereby preferably the risk of damage to the tissue in which the cannula is placed, for example due to sudden movements of the cannula with respect to the blood vessel, is substantially reduced. For example, movements in a direction at least partially perpendicular to the insertion direction of the needle may cause substantial damage to the tissue in which the cannula is placed.

The present invention provides a cannula insertion system as described herein.

In accordance with the present invention, the cannula insertion system comprises a safety device configured to retract the cannula or to release the cannula from the cannula insertion device in case a safety requirement is not met. This safety requirement is not met when a force exerted on the cannula, for example on a distal end of the cannula, in a direction perpendicular to the insertion direction results in exceeding a safety threshold value.

The safety threshold value may for example be a maximum torque resulting from the force that may be exerted on the cannula and/or a maximum transverse force that may be exerted on the cannula.

In an embodiment, another safety requirement may not be met when a force exerted on the cannula, for example on a distal end of the cannula, in a direction parallel to the insertion direction results in exceeding a respective safety threshold value.

The cannula of the cannula insertion system will be inserted into a body part, for example an arm or leg, of a human or animal. Sudden movements of this body part with respect to the cannula insertion system or unexpected movements of the cannula insertion system with respect to this body part, may result in potential damage of the tissue in which the cannula is inserted, for example damage of a blood vessel or surrounding tissues thereof. These potential dangerous movements will result in a transverse force and/or parallel force being exerted on the distal end of the cannula, i.e. the part of the cannula that may be inserted into the human or animal body in a direction perpendicular and/or parallel to the insertion direction of the cannula into the human or animal body.

In an embodiment of the invention, the safety device is arranged to react to such transverse force, i.e. the force being exerted on the distal end of the cannula in a direction perpendicular to the insertion direction of the cannula and/or such parallel force, i.e. the force being exerted on the distal end of the cannula in a direction parallel to the insertion direction of the cannula. In particular, the safety device is arranged to carry out a safety measure when the transverse force and/or parallel force results in exceeding a respective safety threshold value. The safety threshold value is preferably selected such that transverse and/or parallel forces that may be exerted on the distal end of the cannula during an insertion of the cannula into a human or animal body are below the safety threshold value. Transverse and/or parallel forces, for example caused by sudden movements of the patient and/or unintended erroneous movements due to positioning of the cannula insertion device, that may cause substantial damage to the tissue in which the cannula is inserted, which normally should not occur during a successful insertion of the cannula into the human or animal body should be above the respective safety threshold value.

In an embodiment, there is a first safety threshold value for a force exerted on the distal end of the cannula in a direction perpendicular to the insertion direction and a second safety threshold value for a force exerted on the distal end of the cannula in a direction parallel to the insertion direction. The first safety threshold value and the second safety threshold value may have the same or different threshold values.

The first safety threshold value may for example be provided as a force or torque that not may exceeded. The first safety threshold value may also be defined as a maximum angular misalignment of the cannula with respect to the insertion direction of the cannula. The second safety threshold value may for example be a maximum force being exerted on the distal end of the cannula in the insertion direction.

According to a first safety measure, the cannula may be automatically released from the cannula insertion device when the transverse and/or parallel force results in exceeding a respective threshold value. After the cannula being released from the cannula insertion device, the cannula may freely move together with the body part in which the cannula is introduced. Therewith damage to tissue of the human or animal body due to relative movement between the cannula insertion device and the body part is substantially reduced.

According to a second safety measure, the cannula may be automatically retracted in a retraction direction opposite to the insertion direction when the transverse force and/or parallel force on the cannula, for example the distal end of the cannula, results in exceeding the respective safety threshold value. By retraction of the cannula, the cannula is pulled out of the human or animal body, for example to avoid the risk of damaging tissue due to a transverse movement of the distal part of the cannula with respect to the body part in which the cannula was inserted.

It is remarked that, in this application, forces having a vector component in the direction perpendicular to the insertion direction of the cannula are regarded to comprise a force perpendicular to the insertion direction of the cannula. Correspondingly, forces having a vector component in the direction parallel to the insertion direction of the cannula are regarded to comprise a force parallel to the insertion direction of the cannula.

In an embodiment, the safety device comprises a cannula holder arranged to hold the cannula if the force exerted on the cannula, for example the distal end of the cannula in the direction perpendicular and/or parallel to the insertion direction is below the respective safety threshold value, and to release the cannula if the force exerted on the cannula, for example the distal end of the cannula in the direction perpendicular and/or parallel to the insertion direction results in exceeding the respective safety threshold value.

In such embodiment, according to the first safety measure, the cannula is held, during insertion of a cannula, by a cannula holder that is configured to release the cannula if the transverse force and/or parallel force results in exceeding the respective safety threshold value.

In an embodiment of the cannula holder, the cannula holder comprises:
 a coupling element arranged on one of the cannula and cannula insertion device;
 a base and a detent mechanism arranged on the other of the cannula and cannula insertion device;
 wherein the coupling element comprises a base surface to cooperate with the base and a detent surface, opposite to the base surface, to cooperate with the detent mechanism,
 wherein the coupling element is configured to be releasably held between the base and the detent mechanism, whereby the detent surface engages the detent mechanism and the base surface engages the base,
 wherein movement of the detent surface in a direction perpendicular to a line on which the detent mechanism and the base are provided will result in release of the coupling element from the detent mechanism and the base.

In such embodiment, the coupling element may be arranged, manually or automatically, between the base and the detent mechanism, whereby the base surface engages the base and the detent surface engages the detent mechanism. The detent mechanism and the base are preferably arranged on a line parallel to the insertion direction of the cannula.

When a transverse force is exerted on the distal end of the cannula, the engagement between the base and base surface may act as a rotation point around which the coupling element may rotate with respect to the base, in particular when the transverse force on the distal end of the cannula results in exceeding the safety threshold value. As a result of such rotation, the detent surface may displace with respect to the detent mechanism such that the engagement between the detent surface and the detent mechanism is released. As a result, the coupling element is no longer held between the base and the detent mechanism.

In an embodiment, the detent mechanism comprises a detent and a spring, wherein the spring is arranged to bias the detent towards the base. The biasing force of the spring creates a clamping of the coupling element between the detent and the base. The biasing force is therefore a measure for the safety threshold value of the cannula holder.

In an embodiment, the detent is a sphere and wherein the detent surface is a concave surface mating with a spherical surface of the sphere.

In an embodiment, the base comprises a projection extending towards the detent mechanism, wherein the base surface comprises a notch mating with the projection.

In an embodiment, the coupling element is mounted on the cannula and wherein the cannula holder comprises a housing comprising a recess mounted on the cannula insertion device, wherein the recess is arranged to receive the coupling element, wherein the housing supports the detent mechanism at one side of the recess and the base at an opposite side of the recess.

In an embodiment, the cannula is a disposable unit, and the coupling element is an integral part of the cannula.

In an embodiment, the cannula insertion system comprises a cannula holder sensor arranged to determine a position of a cannula held by the cannula holder. The position of the cannula may be determine in one or more degrees of freedom, including one or more translation positions and/or one or more rotation positions.

The cannula holder sensor may be arranged at any suitable location, such as a cannula insertion device positioning system, a sensor or a positioning system for such sensor. The cannula holder sensor may for example be arranged on a contact sensor, such as a ultrasound transducer or a positioning system for such contact sensor to determine a relative position of the cannula with respect to the contact sensor. This allows to determine a position of the cannula with respect to a location where a sensor signal is obtained.

The cannula holder sensor may also be arranged at a separate location where it can determine a relative position of the cannula with respect to the contact sensor, by measuring from this separate location both the position of the cannula and the position of the contact sensor.

In an embodiment, the cannula holder sensor is arranged to determine alignment of the cannula with the insertion direction of the cannula insertion device. During insertion of a cannula into a body part, the cannula will be moved by the cannula insertion device in the insertion direction. To ensure that the cannula will be properly moved into the body part the cannula holder sensor may determine whether the cannula is properly aligned with the insertion direction of the cannula insertion device.

In an embodiment, the cannula holder sensor can also be used to determine whether a cannula is held by the cannula holder, for example before the automatic insertion procedure of the cannula into the body part is started.

In an embodiment, the safety device comprises, according to the second safety measure, a cannula retraction device arranged to retract the cannula in a retraction direction opposite to the insertion direction, when the force exerted on the cannula, for example the distal end of the cannula in the direction perpendicular and/or parallel to the insertion direction results in exceeding the safety respective threshold value. A cannula retraction device may be used to automatically retract the cannula in the retraction direction. This retraction direction is parallel but opposite to the insertion direction to ensure that the cannula is pulled out of the body part of the human or animal with minimal damage to the tissue of the body part in which the cannula is placed.

The cannula retraction device is preferably a mechanical device, i.e. the cannula retraction device may retract the cannula automatically without an electromotor or hydraulic or pneumatic actuator, when the transverse force and/or parallel force on the distal part of the cannula results in exceeding the safety threshold value.

In an embodiment, the cannula retraction device comprises:
- a linear guide extending in the retraction direction and mounted on the cannula insertion device, in which the cannula is slidably movable between an insertion position and a retracted position,
- a spring element arranged to bias the cannula to the retracted position,
- a blocking device arranged to block movement of the cannula from the insertion position to the retracted position, when a force exerted on the cannula, for example the distal end of the cannula in the direction perpendicular and/or parallel to the insertion direction is below the respective safety threshold value and to allow movement of the cannula from the insertion position to the retracted position when the force exerted on the cannula, for example the distal end of the cannula in the direction perpendicular and/or parallel to the insertion direction results in exceeding the respective safety threshold value.

The blocking device may for example be a clamping device that clamps the cannula in the insertion position.

In an embodiment, the cannula insertion system further comprises:
- a positioning system supporting the cannula insertion device, and
- a control device arranged to control the positioning system to position, on the basis of a determined location for insertion of the cannula into the human or animal body, the cannula insertion device in a suitable position to insert the cannula into the human or animal body.

The positioning system and the control device may be used to automatically insert the cannula into the desired body part of the human or animal.

In an embodiment, the safety device comprises a sensor arranged to measure a signal representative for the force exerted on the needle in a direction perpendicular and/or parallel to the insertion direction, wherein the cannula holder is controlled by the control device, and wherein the control device is arranged to control the cannula holder to release the cannula when the force exerted on the cannula, for example the distal end of the cannula in a direction perpendicular and/or parallel to the insertion direction results in exceeding the respective safety threshold value.

In this embodiment a sensor may be provided to measure a signal representative for the transverse force and/or parallel force exerted on the cannula, for example the distal end of the cannula. This sensor may be a force sensor or a torque sensor, but also a sensor arranged to determine a position or rotational position of the cannula. This position or rotational position may for example be determined by cameras using visible or infrared light, a distance sensor, a rotational encoder, or such. The sensor signal of this sensor may be fed into the control device.

It is remarked that the cannula holder may also be controlled by a control device other than the control device of the positioning system.

The control device may compare the sensor signal with a safety threshold value. Further, the control device is arranged to control a cannula holder that releasably holds the cannula. The cannula holder may for example comprise a mechanical gripper or magnetic holding device that can be arranged in a holding state in which the cannula can be held by the cannula holder and a release state in which the cannula is not held by the cannula holder. When the safety threshold value is exceeded, the control device may control the cannula holder to switch from the holding state to the release state such that the cannula is released from the cannula holder.

In an embodiment, the safety device comprises a sensor arranged to measure a signal representative for the force exerted on the needle in a direction perpendicular and/or parallel to the insertion direction, and wherein the control device is arranged to control the positioning system and/or the cannula insertion device to retract the cannula in the retraction direction when the force exerted on the cannula, for example the distal end of the cannula in a direction perpendicular and/or parallel to the insertion direction results in exceeding the respective safety threshold value.

In this embodiment, a similar sensor may be used, but the control device is now arranged to control the positioning system and/or the cannula insertion device to retract the cannula in the retraction direction when the transverse force and/or the parallel force exerted on the cannula, for example the distal end of the cannula results in exceeding the threshold value.

In the embodiments in which the release of the cannula or the retraction of the cannula is controlled by a control device, the control device may also be arranged to control the cannula holder or the positioning system and/or the cannula insertion device to release or retract the cannula, respectively, when another safety criterion is not fulfilled. Such safety criterion may for example not be fulfilled when an error is detected in the cannula insertion system. Such error may for instance relate to a temperature level in the cannula insertion system exceeding a maximum allowable temperature level, a signal indicating that a needle is not properly coupled to the needle insertion device or that a cannula is not properly aligned with the insertion direction the cannula insertion device. The control device may also be arranged to control the cannula holder or the positioning system and/or the cannula insertion device to release or retract the cannula, respectively, when there is a failure in the power provision of the cannula insertion system. In an embodiment, the safety device comprises an adjustment mechanism to adjust the safety threshold value. It may be advantageous that the safety threshold value may be adjusted. For example, in a mechanical cannula holder that releasably holds the cannula on the basis of a clamping force, the level of this clamping force may be adjusted to adjust the level of the safety threshold value.

In an embodiment, the safety device is configured to retract the cannula or to release the cannula from the cannula insertion device when a power outage occurs. It is undesirable that the cannula will remain in a human or animal body in case of a power outage. Therefore, the cannula insertion system may also be configured to release or retract the cannula when a power outage occurs.

In an embodiment, the safety device comprises a cannula retraction device arranged to retract the cannula in a retraction direction opposite to the insertion direction, when the power outage occurs.

In an embodiment, the cannula insertion device comprises an insertion actuator to move the cannula at least from the retracted position to the insert position, and wherein the cannula retraction device comprises a biasing element arranged to bias the cannula to the retracted position, such that for example in case of a power outage the biasing element pushes the cannula to the retracted position. The cannula insertion device is used to insert the cannula into the human or animal body by moving, after the cannula insertion device has been positioned in a suitable position, the cannula from the retracted position to the insertion position. When the insertion actuator fails the biasing element, for instance a spring, may push the cannula back to the retracted position. In the retracted position, the cannula will no longer be arranged in the human or animal body.

In an embodiment, the cannula insertion device may comprise a linear insertion guide along which the cannula is movable between the insertion position and the retracted position.

In an alternative embodiment, the cannula retraction device comprises:
a linear guide extending in the retraction direction and mounted on the cannula insertion device, in which the cannula is slidably movable between an insertion position and a retracted position,
a biasing element arranged to bias the cannula to the retracted position,
an electrically operated blocking device arranged to block movement of the cannula from the insertion position to the retracted position, when energized, and to allow movement of the cannula from the insertion position to the retracted position, when not energized.

In an embodiment, the cannula insertion system is constructed to autonomously insert the cannula into a blood vessel. This means that the cannula insertion system may be configured to carry out, without any interaction of a human operator, the following steps:
measuring, with a blood vessel location sensor, one or more sensor signals representative for a location of the blood vessel,
determining, with a processing device, a location of a blood vessel on the basis of the one or more sensor signals,
positioning, on the basis of the determined location of the blood vessel, with the positioning system, the cannula insertion device in a suitable position to insert the cannula into the blood vessel, and
inserting the cannula into the blood vessel.

In an embodiment, the cannula insertion system may further be configured to carry out the step of measuring, with a sensor, a signal representative for the force exerted on the cannula in a direction perpendicular and/or parallel to the insertion direction, and
controlling with the control device an active cannula holder to release the cannula when the force exerted on the cannula, for example the distal end of the cannula in a direction perpendicular and/or parallel to the insertion direction results in exceeding the respective safety threshold value.

In another embodiment, the cannula insertion system may further be configured to carry out the step of measuring, with a sensor, a signal representative for the force exerted on the needle in a direction perpendicular and/or parallel to the insertion direction, and controlling with the control device the positioning system and/or the cannula insertion device to retract the cannula in the retraction direction when the force exerted on the cannula, for example the distal end of the cannula in a direction perpendicular and/or parallel to the insertion direction results in exceeding the respective safety threshold value.

In an embodiment, the cannula is a needle. The cannula may be any tube like element that is configured to be introduced into a human or animal body, for example into a blood vessel. Preferably, the cannula is a needle, in particular a needle suitable to draw blood from a blood vessel.

In an embodiment, the cannula insertion system is constructed to autonomously draw blood from a blood vessel. In other embodiments, the cannula insertion system may be used to insert a cannula into a body part of a human or animal, for example for venous medication, infusions, biopsy, robot surgery, laparoscopic surgery, etc.

According to a further aspect of the invention, there is provided a cannula insertion system for inserting a cannula into a human or animal body, comprising:
a cannula; and
a cannula insertion device to hold and insert the cannula into the human or animal body in an insertion direction, wherein the cannula insertion device comprises a cannula holder to releasably hold the cannula,
characterized in that the cannula insertion system comprises a cannula holder sensor arranged to determine whether a cannula is held by the cannula holder and/or to determine a position of the cannula, for example with respect to the insertion direction of the cannula insertion device.

It is desirable that the cannula is properly aligned with the insertion direction of the cannula insertion device, i.e. a longitudinal axis of the cannula is parallel to the insertion direction. The cannula insertion system may comprise a cannula holder sensor for example arranged to determine whether a cannula is held by the cannula holder and/or whether a cannula held by the cannula holder is properly aligned with the insertion direction ID of the cannula insertion device.

The cannula holder sensor may be connected to a control device of the cannula insertion system, that may check that the cannula is properly held by the cannula insertion device before the procedure of automatic insertion of the cannula into a body part is started. The cannula holder sensor may be used to compensate for relatively large tolerances in the cannula or the cannula insertion device.

In an embodiment, the cannula holder sensor is configured to determine a position of the cannula, for example the distal end of the cannula in at least one degree of freedom, for example, three or six degrees of freedom. The position of the cannula, for example the distal end of the cannula may be determined with respect to the cannula insertion device and/or with respect to the human or animal body and/or with respect to one or more sensors to determine a one or more features or characteristics of the human or animal body, for example with respect to a contact sensor, such as a ultrasound transducer.

In an embodiment, the relative positions of the cannula, for example the distal end of the cannula, the cannula insertion device, the human or animal body and/or the location of other sensors may be determined on the basis of sensor signals obtained by multiple sensors, one of these sensors being the cannula holder sensor.

BRIEF DESCRIPTION OF THE DRAWINGS

Further characteristics and advantages of the cannula insertion system of the invention will now be explained by description of an embodiment of the invention, whereby reference is made to the appended drawings, in which.

DETAILED DESCRIPTION OF THE INVENTION

Figure 1:
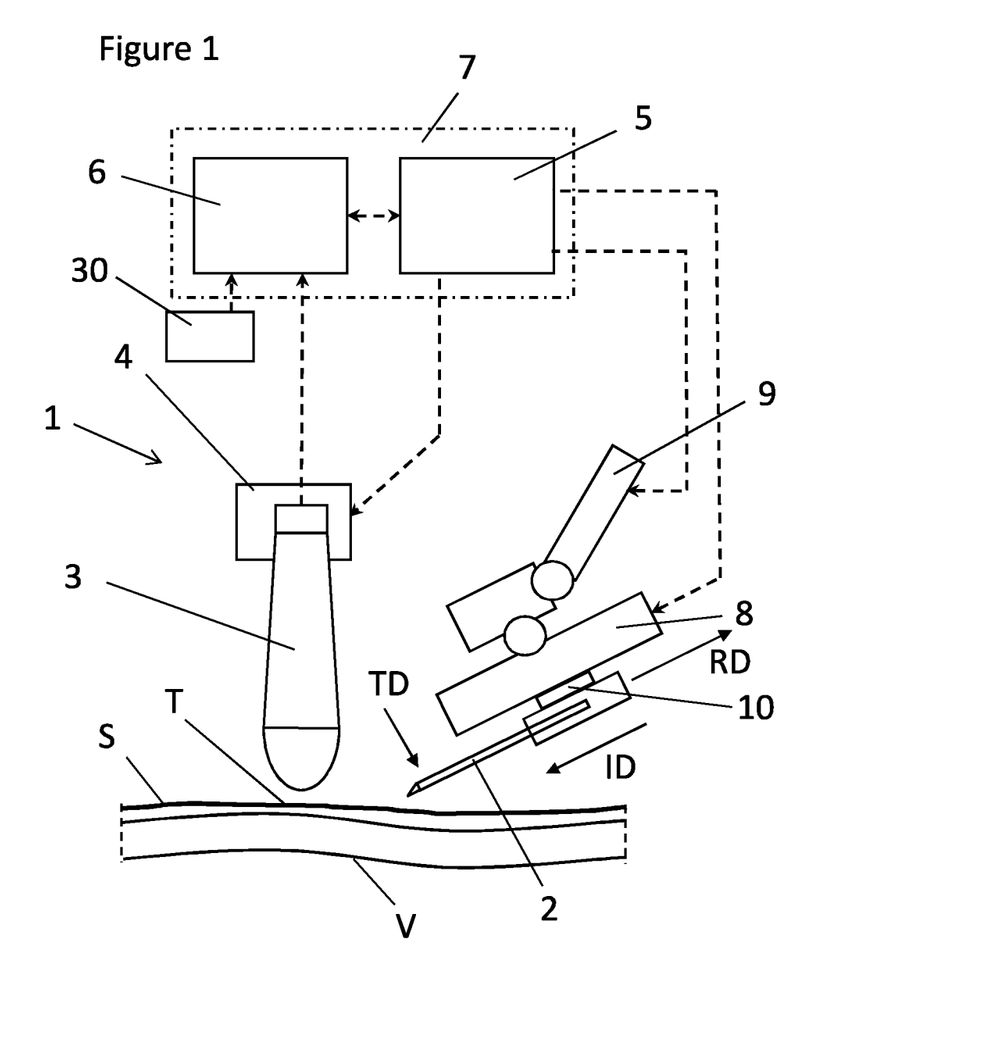
FIG. 1 shows schematically a cannula insertion system according to an embodiment of the invention.

FIG. 1 shows a cannula insertion system, generally denoted by reference numeral 1. The cannula insertion system 1 is configured to autonomously insert a cannula 2, for example a needle into a blood vessel V of a human or animal. The cannula insertion system 1 as shown in FIG. 1 is in particular configured to autonomously draw blood from a blood vessel. In alternative embodiments, the cannula insertion system 1 may be configured to arrange a cannula in a blood vessel V for venous medication and/or infusions. An automatic cannula insertion system may also be configured as a biopsy device, a surgery robot, a laparoscopic robot, or any other system that may use an autonomous cannula insertion system in a body part of human or animal.

To draw blood from the blood vessel V, the cannula insertion system 1 may be arranged to determine a location of a blood vessel underneath the skin S of the human or animal, insert a cannula 2 into the blood vessel V and draw blood from the blood vessel V without direct interaction of an operator of the cannula insertion system 1.

Autonomous cannula insertion systems are known in the prior art. For example, US2008/0275396 A1 discloses an automated cannula insertion system for autonomously inserting a cannula into a blood vessel of a human or an animal, the contents of which are herein incorporated by reference in its entirety.

The cannula insertion system 1, shown on FIG. 1, comprises an ultrasound transducer 3 to obtain one or more sensor signals that are representative for the location of a blood vessel V in the human or animal. The ultrasound transducer 3 is a contact sensor. During use contact between the ultrasound transducer 3 and the skin S is required in order to obtain relevant data with respect to the location of the blood vessel V. An ultrasound transducer positioning system 4 is provided to guide the ultrasound transducer along the skin S of the human or animal in a target area T. This target area T is an area of the skin S underneath which the presence of a blood vessel V suitable for insertion of a cannula 2 is expected and which is examined by the ultrasound transducer 3. A control device 5 controls the position of the ultrasound transducer 3 by sending a control signal to the ultrasound transducer positioning system 4.

The target area T may be determined by obtaining images of the skin of a human or animal, for example using a NIR (near infrared) sensor 30, and determining on the basis of the images an area in which it is likely that a blood vessel suitable for insertion of a cannula will be found.

The ultrasound transducer 3 provides a sensor signal representative for a location of the blood vessel V. The sensor signal is fed into a processing device 6 which is arranged to process the sensor signal. The control device 5 and the processing device 6 may be comprised in a single processer 7, such as a PC.

In practice, multiple sensors may be used to collect data relevant for the determination of the location of a blood vessel V underneath the skin S of a human or animal. These sensors may include contact sensors, that need to be placed on the skin S to obtain relevant data, and non-contact sensors, that can obtain information at a distance from the skin S.

On the basis of the sensor signal, or sensor signals, the processing device 6 determines the location of a blood vessel V suitable for the insertion of the cannula 2. On the basis of this location, the processing device 6 may determine an insertion path for insertion of the cannula 2 into the blood vessel V.

The cannula 2 is arranged on a cannula insertion device 8. The cannula insertion device 8 is arranged to insert the cannula 2 in an insertion direction ID through the skin S and into the blood vessel V along the insertion path determined by the processing device 6. A longitudinal axis of the cannula 2 is aligned with the insertion direction ID.

The cannula insertion device 8 is supported by a positioning system 9, for example a robot arm, that is arranged to bring the cannula insertion device 8 in a position from which the cannula insertion device 8 may move the cannula 2 along the insertion path. The cannula insertion device 8 and the positioning system 9 are controlled by the control device 5.

Figure 2:
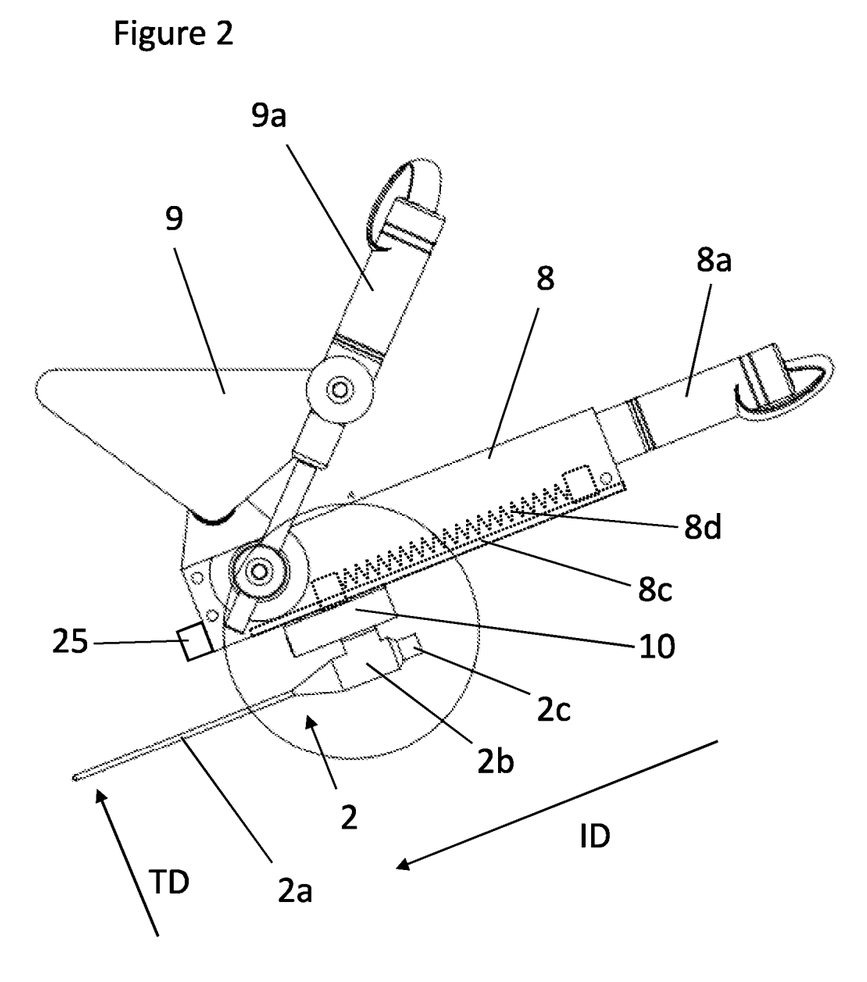
FIG. 2 shows an embodiment of a cannula insertion device and cannula in more detail.

FIG. 2 shows an embodiment of a needle insertion device 8 supporting a cannula 2 in more detail. The needle insertion device 8 comprises a linear insertion actuator 8a arranged to move the cannula 2, when operated by the processing device 6, in the insertion direction ID from a retracted position to an insertion position to insert the cannula 2 into a body part, in particular a blood vessel V, of a human or animal. The cannula insertion device may comprise a linear insertion guide 8c along which the cannula 2 is movable between the insertion position and the retracted position.

A biasing element 8*d*, for example a spring may be arranged to bias the cannula 2 to the retracted position. When the linear insertion actuator 8*a* fails, for example due to a power outage, the biasing element 8*d* will push the cannula 2 back to the retracted position. In the retracted position, the cannula 2 will no longer be arranged in the human or animal body. Thus in case of a power outage, the cannula 2 will automatically be pulled out of the human or animal body.

The positioning system 9 comprises at least one actuator 9*a* configured to rotate the cannula insertion device 8 with respect to the positioning system 9 in order to adapt the insertion direction ID of the needle insertion device 8 as defined by the actuating movement of the linear insertion actuator 8*a*.

It is remarked that in alternative embodiments, the cannula insertion device 8 and the position system 9 may be integrated in a single cannula positioning device.

The cannula as shown in FIG. 2 comprises a needle tube 2*a* having a distal end to be introduced into the desired body part of the human or animal, and a connection device 2*b* arranged at the proximal end of the needle tube 2*a*. The connection device 2*b* is configured to mount the cannula 2 to the cannula insertion device. The connection device 2*b* further comprises a connection port 2*c* to connect the needle tube 2*a* to a further device, such as a tube, for example a blood collection tube or infusion tube, or a blood collection container.

Once the cannula 2 is inserted into the blood vessel V, the cannula insertion system 1 is arranged to draw blood from the human or animal by filling one or more blood collection containers with blood. The cannula insertion system may comprise a blood container handling system to fill and close these blood collection containers. When sufficient blood has been drawn from the human or animal, the cannula insertion device 8 may withdraw the cannula 2 from the blood vessel V and out of the skin S. Thereafter, the positioning system 9 may move the cannula insertion device 8 to a location where there is no or substantially less risk that the cannula 2 will penetrate the skin S, when, for example, the body part in which the blood vessel V is present, such as an arm is withdrawn from a cannula insertion position in the cannula insertion system 1.

When the cannula 2 is present in the blood vessel V, or any other body part, it is undesirable that a substantial transverse force, i.e. a force exerted on the distal end of the cannula in a direction TD perpendicular to the insertion direction ID of the cannula 2 is exerted, since such transverse force may lead to substantial damage of the blood vessel V or damage of the tissue surrounding the blood vessel V, for example the skin S. The transverse force may for example result from sudden movements of the body part in which the cannula is inserted with respect to the cannula insertion system 1, or an erroneous unintended movement caused by the positioning system 9.

To prevent that an excessive transverse force is exerted on the blood vessel or surrounding tissues, a safety device is provided. The safety device is in the shown embodiment provided as a cannula holder 10 which is configured to releasably hold the cannula 2. Before the insertion procedure is started, the cannula 2 may manually or automatically be placed in the cannula holder 2.

It is desirable that the cannula 2 is properly aligned with the insertion direction ID, i.e. a longitudinal axis of the cannula 2 is parallel to the insertion direction. Therefore, as shown in FIG. 2, the cannula insertion system comprises a cannula holder sensor 25 arranged to determine a position of the cannula 2 held by the cannula holder 10. The measured position of the cannula 2 can for example be used to check whether the cannula 2 is properly aligned with the insertion direction ID of the cannula insertion device 8. The cannula holder sensor 25 can be connected to the control device 5 allowing the control device 5 to check that the cannula 2 is properly held by the cannula holder 10 before the procedure of automatic insertion of the cannula 2 into a body part is started.

In case the measurements of the cannula holder sensor 25 indicate that the cannula is not properly aligned with the insertion direction ID, the cannula holder 10 may be arranged to adapt the position, for example the orientation, of the cannula 2 to align the cannula with the insertion direction ID. In this way tolerances in cannula 2 and/or in the cannula insertion device may be compensated.

The cannula holder sensor 25 may, in addition or as an alternative, be used to check the presence of the cannula 2 in the cannula holder 10. This may for example be applied when the cannula 2 is automatically aligned with the insertion direction ID upon placement of the cannula 2 into the cannula holder 10.

The cannula holder sensor 25 may be configured to determine a position of the cannula 2 in at least three degrees of freedom, for example six degrees of freedom. The cannula holder sensor 25 may be configured to determine relative position changes between the distal end of the cannula 2 and the target area T of the human or animal body. Any unexpected movement between the distal end of the cannula 2 and the target area T may indicate a movement of the target area T, e.g. an arm movement.

Such sensor signal of the cannula holder sensor 25 may also be used to activate a safety device to release the cannula from the cannula holder 10 and/or to retract the cannula 2.

Figure 3:
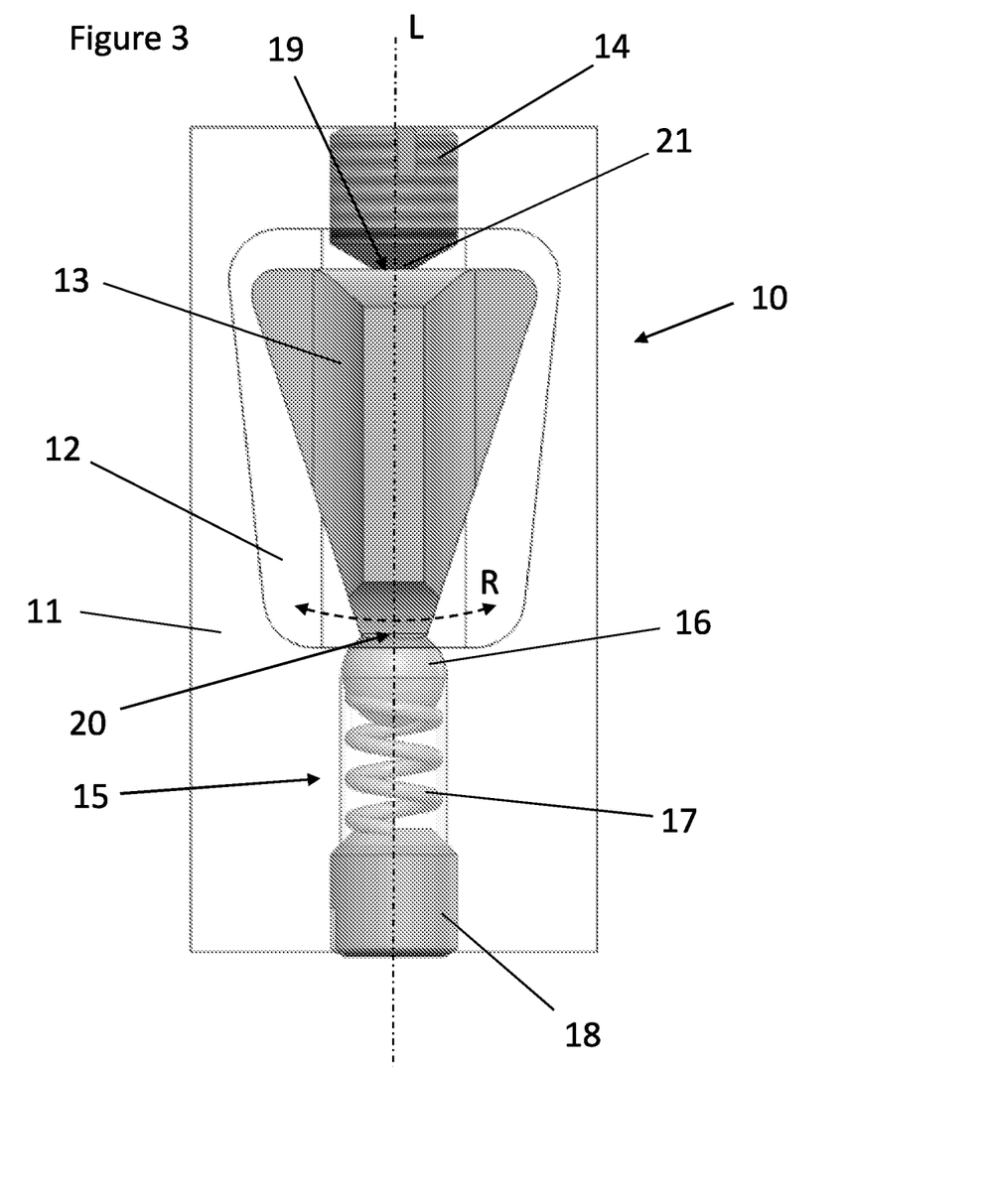
FIG. 3 shows an embodiment of a cannula holder arranged to releasably hold a cannula.

FIG. 3 shows an embodiment of the cannula holder 10 in more detail. The cannula holder 10 comprises a housing 11 having a recess 12. The recess 12 is configured to receive a coupling element 13 mounted on the cannula 2. The coupling element 13 may be an integral part of the cannula 2, for example an integral part of the connection device 2*b* of the cannula 2 shown in FIG. 2. In another embodiment, the coupling element 13 may be a separate element, for example having a holder to hold the cannula 2.

In the recess 12 a base 14 and a detent mechanism 15 are arranged at opposite sides of the recess 12. The base 14 and the detent mechanism 15 are aligned with respect to a line L which is parallel to the insertion direction ID of the cannula 2, whereby the location of the base 14 is more proximal in the insertion direction ID compared to location of the detent mechanism 15.

The detent mechanism 15 comprises a spherical detent 16, a spring 17 and a detent base 18. The detent base 18 comprises an outer screw thread with which it screwed into a screw channel in the housing 11. The spring 17 biases with a biasing force the detent 16 towards the base 14. The biasing force of the spring may be adapted by rotation of the detent base in the screw channel wherein it is placed. Therewith, the safety threshold value may be adjusted.

The coupling element 13 comprises a base surface 19 to cooperate with the base 14 and a detent surface 20, opposite to the base surface 16, to cooperate with the detent mechanism 15. As shown in FIG. 3, the coupling element 13 may be held between the base 14 and the detent mechanism 15, whereby the detent surface 20 engages the detent mechanism 15, in particular the detent 16, and the base surface 19 engages the base 14. The spring 17 biases the detent 16 against the detent surface 20. The detent surface 20 is provided with a concave surface that mates with the spherical surface of the detent 16.

The base 14 comprises a pointed projection 21 extending towards the detent mechanism 15. The base surface 19 may comprises a notch mating with the projection 21.

When a transverse force is exerted on a distal end of the cannula 2, the coupling element 13 will have a tendency to make a rotation R with respect to the housing 11. The engagement of the projection 21 and the notch in the base surface 19 may form a rotation point for such rotation of the coupling element 13.

The biasing force of the spring 17 that pushes the detent 16 into the concave detent surface 20, prevents rotation R of the coupling element 13 as long the force exerted on the distal end of the cannula 2 is insufficient to overcome the biasing force with which the detent 16 is pushed into the concave detent surface 20 of the coupling element 20. When the force exerted on the distal end of the cannula 2 is sufficient to move the detent 16 in the direction of the detent base 18, thereby compressing the spring 17, the safety threshold value is exceeded.

In that case the coupling element 13 may be rotated in rotation direction R with respect to the location of engagement between the base 14 and the base surface 19. When rotation R continues the coupling element 13 is no longer held between the base 14 and the detent mechanism 15. As a result, the cannula 2 is released from the cannula insertion device 8. The cannula may still be in the body part in which it is inserted, but relative movement between the body part and the needle insertion device 8 can take place without the cannula being pulled with a large force in a transverse direction in the body part in which it is inserted.

Figure 4A:
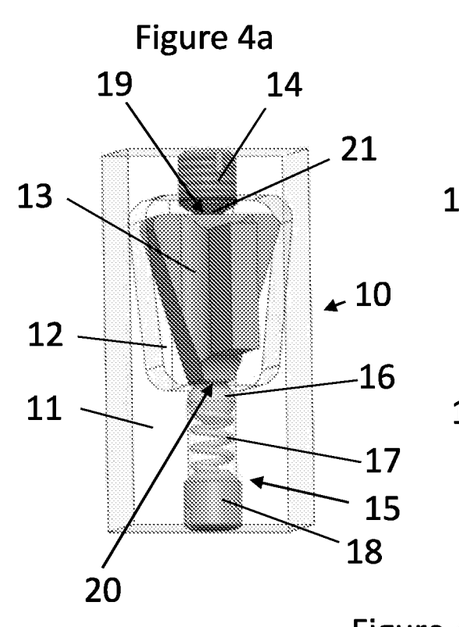
FIGS. 4a, 4b and 4c show different states of the cannula holder of FIG. 3.
Figure 4B:
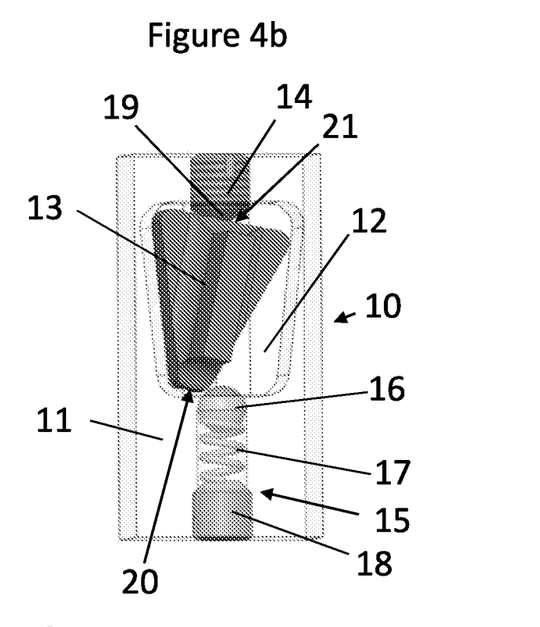
Figure 4C:
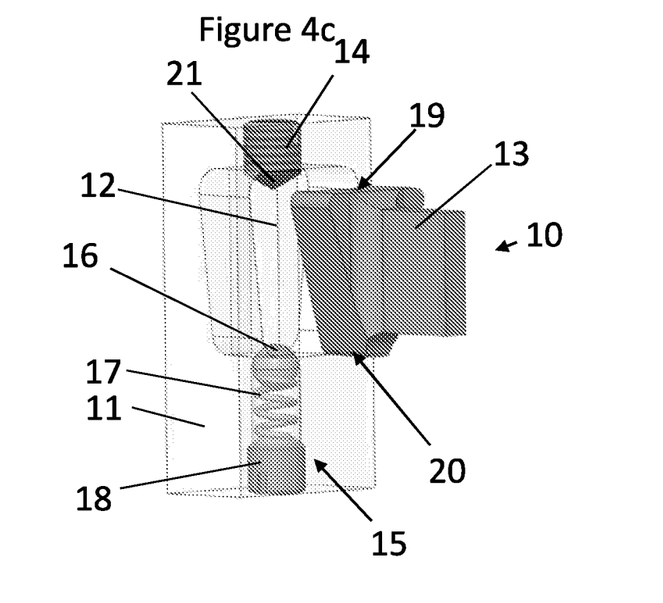

FIGS. 4a, 4b and 4c show the different stages of release of the coupling element 13 from the cannula holder 10.

FIG. 4a shows the coupling element 13 held, by the clamping force of the spring 17 between the detent 16 and the base 14.

FIG. 4b shows the coupling element 13 after rotation about the location of engagement between the base 14 and the base surface 19. There is still an engagement between the base 14 and the base surface 19, but there is no longer contact between the detent 16 and the detent surface 20. As a result, the coupling element 13 is free to move out of the recess 11.

FIG. 4c shows the coupling element 13 moved out of the recess 11. The cannula 2 which is connected to the coupling element 13 is no longer connected to the cannula insertion device 8.

Figure 5A:
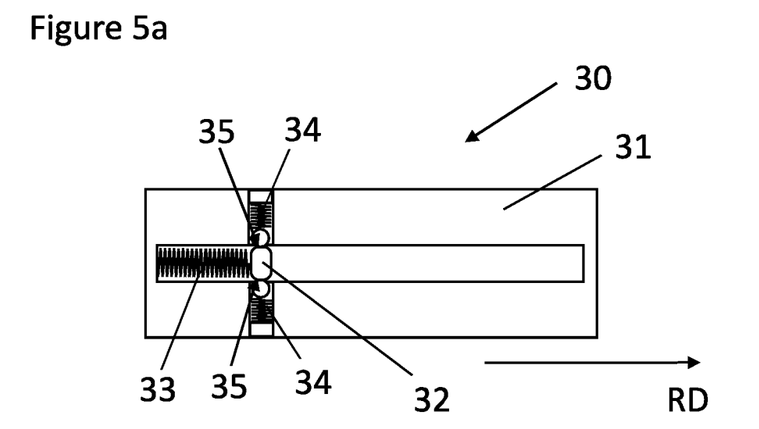
FIGS. 5a and 5b show different states of a cannula retraction device that can be applied as a safety device in the cannula insertion system of FIG. 1.
Figure 5B:
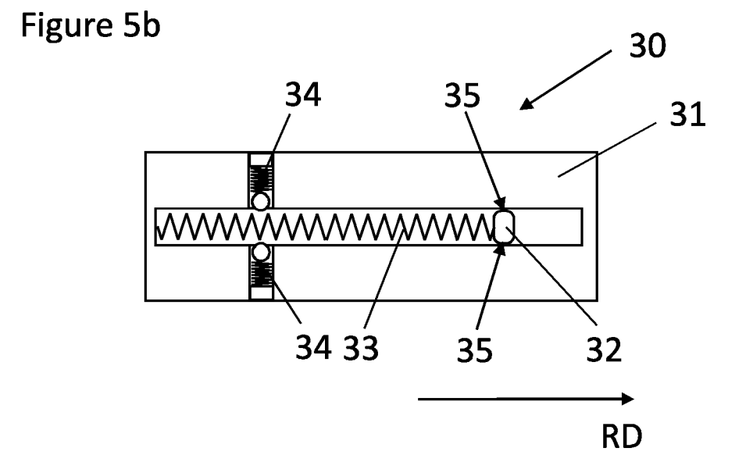

FIGS. 5a and 5b show another embodiment of a safety device according to an embodiment of the invention.

In the embodiment of FIGS. 5a and 5b, the safety device comprises a cannula retraction device 30 arranged to automatically retract the cannula 2 in a retraction direction RD, when the force exerted on the distal end of the cannula 2 in a direction perpendicular to the insertion direction results in exceeding the safety threshold value.

The retraction direction RD is parallel but opposite to the insertion direction ID to ensure that the cannula 2 is pulled out of the body part of the human or animal with minimal damage to the tissue of the body part in which the cannula 2 is placed.

The cannula retraction device 30 comprises a linear guide 31 extending in the retraction direction RD and mounted on the cannula insertion device 8. A stop element 32 connected to the cannula 2 is arranged in the linear guide 31 and slidably movable between an insertion position, as shown in FIG. 5a, and a retracted position, as shown in FIG. 5b. A spring element 33 is arranged to bias the stop element 32 and therewith the cannula 2 to the retracted position.

Blocking devices 34 are arranged to block movement of the stop element 32 from the insertion position to the retracted position. The blocking devices 34 comprise detent mechanisms that bias a detent on a stop surface 35 of the stop element 32.

During insertion of a cannula 2 into a body part, the stop element 32 is arranged in the insertion position as shown in FIG. 5a. A transverse force exerted on the distal end of the cannula 2 will result in a torque exerted on the stop element 32. When the torque on the stop element 32 is below the safety threshold value as provided by the blocking devices 34, the blocking devices 34 will keep the stop element 32 in the insertion position.

However, when the torque on the stop element 32 resulting from the transverse force exerted on the distal end of the cannula 2 results in exceeding the safety threshold value, the stop element 32 will rotate out of the blocking device 32. As a result, the spring element 35 is no longer blocked to move the stop element 32 along the linear guide 31 to the retracted position as shown in FIG. 5b.

Due to the movement of the stop element 32 from the insertion position to the retracted position, the cannula 2 will make a movement in the retraction direction RD, i.e. parallel but opposite to the insertion direction ID. This result in a retraction of the cannula 2 from the body part in which it was inserted.

The cannula retraction device 30 will also retract the cannula 2 from the body part in which it was inserted, when a force exerted on a distal end of the cannula 2 in a direction parallel to the insertion direction ID results in exceeding a second safety threshold value. When a force in the retraction direction RD exceeds the second safety threshold value, the stop element 32 will be simultaneously pushed out of both detent mechanisms 34. The spring element 35 will consequently push the stop element 32 along the linear guide to the retracted position shown in FIG. 5b, therewith moving the cannula 2 also to the retracted position.

In an alternative embodiment, the cannula retraction device 30 may be designed such that the cannula 2 will only be retracted from the body part in which it was inserted, when a force exerted on the distal end of the cannula 2 in a direction parallel to the insertion direction ID results in exceeding a respective safety threshold value.

Figure 6:
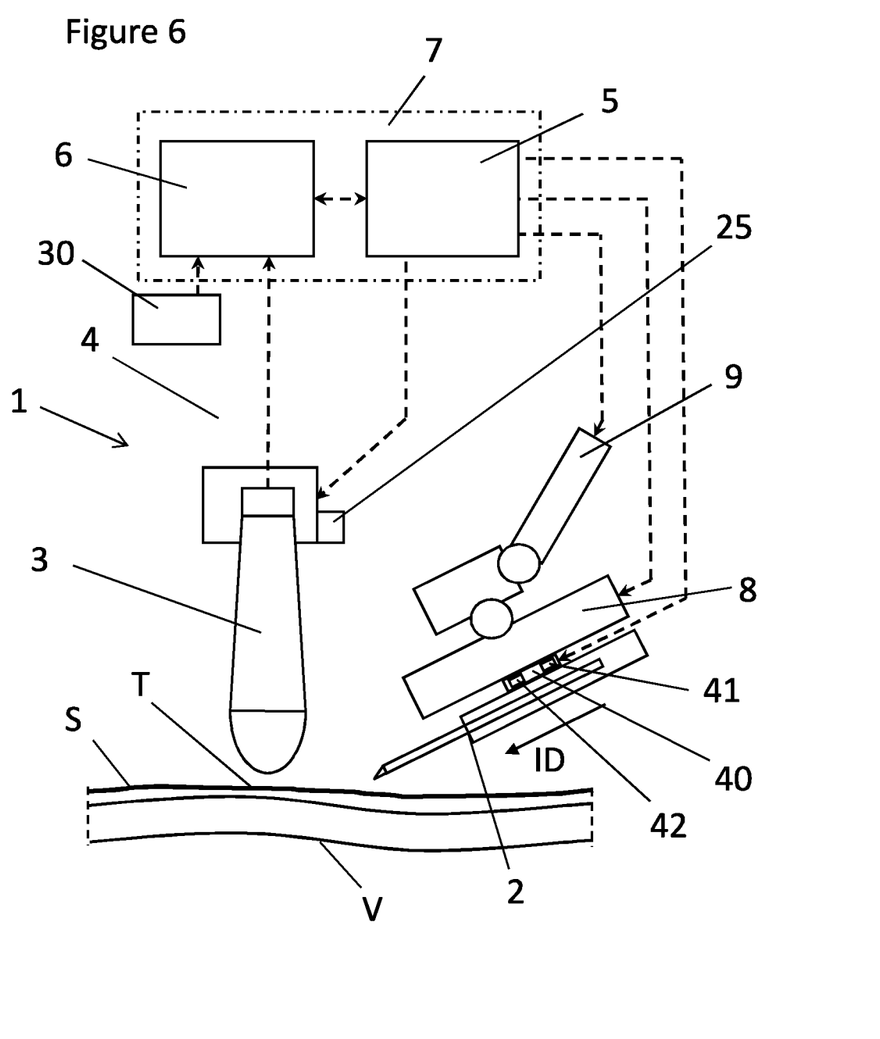
FIG. 6 shows a further alternative embodiment of a cannula insertion system according to the invention.

FIG. 6 shows a further embodiment of a cannula insertion system 1 comprising an active cannula holder 40 controlled by the control device 5. In an alternative embodiment, the active cannula holder may also be controlled by its own control device, or any other suitable control device.

The active cannula holder 40 comprises a holding device 41 having an actuator controlled by the control device 5 to switch the holding device 41 between a holding state and a release state. In the holding state the holding device 41 will hold the cannula 2 placed in the holding device 41. In the release state, the holding device 41 will release the cannula 2, i.e. the cannula will no longer held by the holding device 41.

The holding device 41 may for example comprise an active gripper that can be arranged in a gripping position (holding state) and a non-gripping position (release state) or an electromagnet that can be arranged in a magnetized state (holding state) and a non-magnetized state (release state)

A sensor 42 is provided to measure a signal representative for the force exerted on a distal end of the cannula in a direction perpendicular to the insertion direction ID. The sensor 42 is a sensor arranged to measure a torque exerted on the cannula at the location where the cannula 2 is held by the active cannula holder 40 due to a force exerted on a distal end of the cannula 2. During normal use, the holding device 41 will be in the holding state. When the torque measured by the sensor 42 exceeds the safety threshold value, the control device 5 will control the holding device 41 to switch from the holding state to the release state to release the cannula 2 from the cannula insertion device 8.

In an alternative embodiment, the sensor may also be a sensor that determines a sensor signal representative for a position or a rotational position of the cannula 2, for example a camera sensor. The sensor may also be arranged at another location than the location of the active cannula holder 40.

The control device may further be arranged to control the cannula holder 40 to release the cannula 2 when another safety criterion is not fulfilled. Such safety criterion may for example be based on an error detection of operating parameters of the cannula insertion system 1. When an undesired value of an operating parameter is detected an error signal may be established in the control device or sent to the control device, and the control device may control the cannula holder 40 to release the cannula 2.

Such error may for instance relate to a temperature level in the cannula insertion system exceeding a maximum allowable temperature level, a signal indicating that a needle is not properly coupled to the needle insertion device 8 or that the cannula 2 is not properly aligned with the insertion direction ID of the cannula insertion device 8. The control device may also be arranged to control the cannula holder 40 to release the cannula 2, when there is a failure in the power provision of the cannula insertion system.

Further, the control device may also be arranged to control the cannula holder 40 to release the cannula 2, when a force exerted on a distal end of the cannula 2 in a direction parallel to the insertion direction ID results in exceeding a second safety threshold value.

In an alternative embodiment of a cannula insertion system according to an aspect of the invention, a sensor 42 is provided to measure a signal representative for the force exerted on a distal end of the cannula 2 in a direction perpendicular and/or parallel to the insertion direction ID. This sensor signal may be provided to the control device 5. In this embodiment, the control device 5 may be arranged to control the positioning system 9 and/or the cannula insertion device 8 to retract the cannula 2 in the retraction direction RD when the force exerted on the distal end of the cannula 2 in a direction perpendicular to the insertion direction ID results in exceeding of the safety threshold value.

In an embodiment, in which a biasing element is provided to automatically move the cannula to the retracted position when the linear insertion actuator 8a is shut off, the control device 5 may also be configured to shut off the linear insertion actuator 8a when the force exerted on the distal end of the cannula 2 in a direction perpendicular and/or the insertion direction ID results in exceeding of the respective safety threshold value.

In the embodiment, shown in FIG. 6, the cannula holder sensor 25 is arranged on the ultrasound transducer positioning device 4. From this location, the cannula holder sensor 25 can directly measure the position of the cannula 2 with respect to the ultrasound transducer 3. This position can be used to properly align the cannula 2 with the insertion location of the cannula 2 as determined with a sensor signal obtained with the ultrasound transducer 3.

Figure 7:
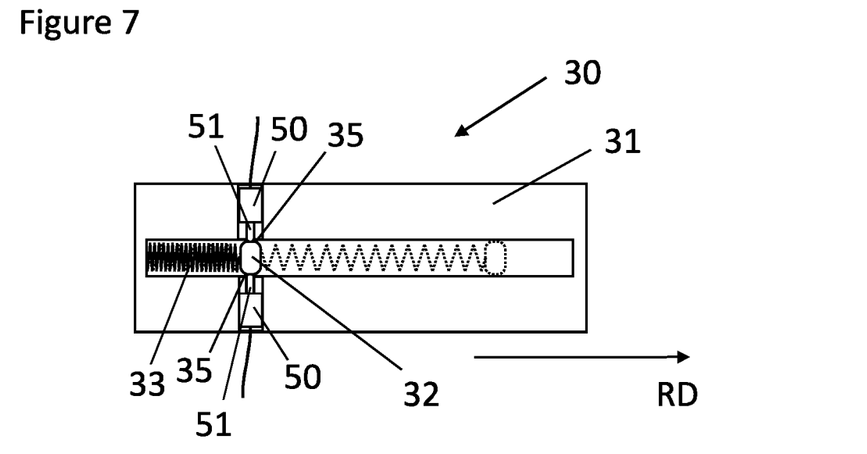
FIG. 7 shows another further alternative embodiment of a cannula insertion system according to the invention.

FIG. 7 shows an embodiment of a cannula retraction device 30 to be used in a cannula insertion system. The cannula retraction device 30 is arranged to automatically retract the cannula 2 in a retraction direction RD, in case there is a power outage. The retraction direction RD is parallel but opposite to the insertion direction ID to ensure that the cannula 2 is pulled out of the body part of the human or animal with minimal damage to the tissue of the body part in which the cannula 2 is placed.

The cannula retraction device 30 comprises a linear guide 31 extending in the retraction direction RD and mounted on the cannula insertion device 8. A stop element 32 connected to the cannula 2 is arranged in the linear guide 31 and slidably movable between an insertion position, as shown in solid lines in FIG. 7, and a retracted position, as shown in dashed lines in FIG. 7. A spring element 33 is arranged to bias the stop element 32 and therewith the cannula 2 to the retracted position.

Blocking devices 50 are arranged to block movement of the stop element 32 from the insertion position to the retracted position. The blocking devices 34 each comprise a detent 51 that is biased, in the insertion position, on a stop surface 35 of the stop element 32.

The blocking devices 50 are electrically operated. Only when the blocking devices 50 are energized the detents 51 will be pushed towards each other to block the stop element 32 therebetween. As soon as the blocking devices 50 are no longer provided with energy, the detents 51 will no longer be pushed towards each other to block the stop element 32, and the stop element 32 will be moved by the spring element 33 to the retracted position.

Thus, during normal use of the cannula insertion system, the blocking devices 50 will hold the cannula 2 in the insertion position, that allows the cannula 2 to be inserted into a human or animal body. In case a power outage occurs, the blocking devices 50 will no longer be energized, as a result thereof, the detents 51 will no longer be pushed against the stop surfaces 35, and the cannula will move to the retracted position. In this retracted position, the cannula 2 cannot be arranged in the animal or human body. In an embodiment, the detents 51 may be biased away from the respective stop surfaces 35, for example by a spring, to actively move the detents 51 away from the stop surfaces 35 to facilitate movement of the stop element 32 from the insertion position to the retracted position.

Aspects of the invention may be described by one or more of the following embodiments:

1. A cannula insertion system for inserting a cannula into a human or animal body, comprising:
   a cannula; and
   a cannula insertion device to hold and insert the cannula into the human or animal body in an insertion direction;
   characterized in that the cannula insertion system comprises a safety device configured to retract the cannula or to release the cannula from the cannula insertion device, in case a safety requirement is not met.

2. The cannula insertion system of embodiment 1, wherein safety device configured to retract the cannula or to release the cannula from the cannula insertion device when a force exerted on a distal end of the cannula in a direction perpendicular and/or parallel to the insertion direction results in exceeding a respective safety threshold value.

3. The cannula insertion system of embodiment 1 or 2, wherein the safety device comprises a cannula holder arranged to:

hold the cannula if the force exerted on the distal end of the cannula in the direction perpendicular and/or parallel to the insertion direction is below the respective safety threshold value, and release the cannula if the force exerted on the distal end of the cannula in the direction perpendicular and/or parallel to the insertion direction results in exceeding the respective safety threshold value.

4. The cannula insertion system of any of the embodiments 1-3, wherein the cannula holder comprises:
a coupling element arranged on one of the cannula and cannula insertion device;
a base and a detent mechanism on the other of the cannula and cannula insertion device;
wherein the coupling element comprises a base surface to cooperate with the base and a detent surface, opposite to the base surface, to cooperate with the detent mechanism,
wherein the coupling element is configured to be releasably held between the base and the detent mechanism, whereby the detent surface engages the detent mechanism and the base surface engages the base,
wherein movement of the detent surface in a direction perpendicular and/or parallel to a line on which the detent mechanism and the base are provided will result in release of the coupling element from the base and the detent mechanism.

5. The cannula insertion system of embodiment 4, wherein the coupling element is mounted on the cannula and wherein the cannula holder comprises a housing comprising a recess mounted on the cannula insertion device, wherein the recess is arranged to receive the coupling element, wherein the housing supports the detent mechanism at one side of the recess and the base at an opposite side of the recess.

6. The cannula insertion system of embodiment 4 or 5, wherein the detent mechanism and the base are arranged on a line parallel to the insertion direction of the cannula insertion device.

7. The cannula insertion system of any of the embodiments 4-6, wherein the cannula is a disposable unit, and wherein the coupling element is an integral part of the cannula.

8. The cannula insertion system of any of the embodiments 1-7, wherein the cannula insertion system comprises a cannula holder sensor arranged to determine a position of a cannula held by the cannula holder.

9. The cannula insertion system of any of embodiment 8, wherein the cannula holder sensor is arranged to determine alignment of the cannula with the insertion direction of the cannula insertion device.

10. The cannula insertion system of any of the embodiments 2-9, wherein the safety device comprises a sensor arranged to measure a signal representative for the force exerted on the cannula in a direction perpendicular and/or parallel to the insertion direction, wherein the cannula holder is controlled by a control device, and wherein the control device is arranged to control the cannula holder to release the cannula when the force exerted on the distal end of the cannula in a direction perpendicular and/or parallel to the insertion direction results in exceeding the respective safety threshold value.

11. The cannula insertion system of any of the embodiments 2-10, wherein the safety device comprises a cannula retraction device arranged to retract the cannula in a retraction direction opposite to the insertion direction, when the force exerted on the distal end of the cannula in the direction perpendicular and/or parallel to the insertion direction results in exceeding the respective safety threshold value.

12. The cannula insertion system of embodiment 11, wherein the cannula retraction device comprises:
a linear guide extending in the retraction direction and mounted on the cannula insertion device, in which the cannula is slidably movable between an insertion position and a retracted position,
a biasing element arranged to bias the cannula to the retracted position,
a blocking element arranged to block movement of the cannula from the insertion position to the retracted position, when a force exerted on the distal end of the cannula in the direction perpendicular and/or parallel to the insertion direction is below the respective safety threshold value and to allow movement of the cannula from the insertion position to the retracted position when the force exerted on the distal end of the cannula in the direction perpendicular and/or parallel to the insertion direction results in exceeding the respective safety threshold value.

13. The cannula insertion system of any of the preceding embodiments, wherein the cannula insertion system further comprises:
a positioning system supporting the cannula insertion device, and
a control device arranged to control the positioning system to position, on the basis of a determined location for insertion of the cannula into the human or animal body, the cannula insertion device in a suitable position to insert the cannula into the human or animal body.

14. The cannula insertion system of embodiment 13, wherein the safety device comprises a sensor arranged to measure a signal representative for the force exerted on the cannula in a direction perpendicular to the insertion direction, and wherein the control device is arranged to control the positioning system and/or the cannula insertion device to retract the cannula in the retraction direction when the force exerted on the distal end of the cannula in a direction perpendicular and/or parallel to the insertion direction results in exceeding the respective safety threshold value.

15. The cannula insertion system of any of the embodiments 2-14, wherein the safety device comprises an adjustment mechanism to adjust the respective safety threshold value.

16. The cannula insertion system of any of the preceding embodiments, wherein the safety device is configured to retract the cannula or to release the cannula from the cannula insertion device when a power outage occurs.

17. The cannula insertion system of any of the preceding embodiments, wherein the cannula insertion system is an autonomous cannula insertion system constructed to autonomously insert the cannula into a blood vessel.

18. The cannula insertion system of any of the preceding embodiments, wherein the cannula is a needle.

19. The cannula insertion system of any of the preceding embodiments, wherein the cannula insertion system is constructed to autonomously draw blood from a blood vessel.

The invention claimed is:

1. A cannula insertion system for inserting a cannula into a human or animal body, comprising:
a cannula; and
a cannula insertion device to hold and insert the cannula into the human or animal body in an insertion direction;
wherein the cannula insertion system comprises a safety device configured to retract the cannula or to release the cannula from the cannula insertion device in response to a force that is exerted on a distal portion of the cannula in a direction perpendicular to the insertion direction and exceeds a first safety threshold value.

2. The cannula insertion system of claim 1, wherein the safety device is further configured to retract the cannula or to release the cannula from the cannula insertion device when a force exerted on the cannula in a direction parallel to the insertion direction results in exceeding a second safety threshold value.

3. The cannula insertion system of claim 2, wherein the safety device comprises a cannula holder arranged to:
hold the cannula if the force exerted on the cannula in the direction perpendicular to the insertion direction is below the first safety threshold value, and
release the cannula if the force exerted on the cannula in the direction perpendicular and/or the direction parallel to the insertion direction results in exceeding the first and/or second safety threshold value, respectively.

4. The cannula insertion system of claim 3, wherein the cannula holder comprises:
a coupling element arranged on one of the cannula and cannula insertion device; and
a base and a detent mechanism on the other one of the cannula and cannula insertion device;
wherein the coupling element comprises a base surface to cooperate with the base and a detent surface, opposite to the base surface, to cooperate with the detent mechanism,
wherein the coupling element is configured to be releasably held between the base and the detent mechanism, whereby the detent surface engages the detent mechanism and the base surface engages the base, and
wherein movement of the detent surface in a direction perpendicular and/or parallel to a line on which the detent mechanism and the base are provided will result in release of the coupling element from the base and the detent mechanism.

5. The cannula insertion system of claim 4, wherein the coupling element is mounted on the cannula and wherein the cannula holder comprises a housing comprising a recess mounted on the cannula insertion device, wherein the recess is arranged to receive the coupling element, wherein the housing supports the detent mechanism at one side of the recess and the base at an opposite side of the recess.

6. The cannula insertion system of claim 4, wherein the detent mechanism and the base are arranged on a line parallel to the insertion direction of the cannula insertion device.

7. The cannula insertion system of claim 4, wherein the cannula is a disposable unit, and wherein the coupling element is an integral part of the cannula.

8. The cannula insertion system of claim 3, wherein the cannula insertion system comprises a cannula holder sensor arranged to determine a position of a cannula held by the cannula holder.

9. The cannula insertion system of claim 8, wherein the cannula holder sensor is arranged to determine alignment of the cannula with the insertion direction of the cannula insertion device.

10. The cannula insertion system of claim 3, wherein the safety device comprises a sensor arranged to measure a signal representative of the force exerted on the cannula in the direction perpendicular and/or the direction parallel to the insertion direction, wherein the cannula holder is controlled by a control device, and wherein the control device is arranged to control the cannula holder to release the cannula when the force exerted on the cannula in the direction perpendicular and/or the direction parallel to the insertion direction results in exceeding the first and/or second safety threshold value, respectively.

11. The cannula insertion system of claim 2, wherein the safety device comprises a cannula retraction device arranged to retract the cannula in a retraction direction opposite to the insertion direction, when the force exerted on the cannula in the direction perpendicular and/or the direction parallel to the insertion direction results in exceeding the first and/or second safety threshold value, respectively.

12. The cannula insertion system of claim 11, wherein the cannula retraction device comprises:
a linear guide extending in the retraction direction and mounted on the cannula insertion device, in which the cannula is slidably movable between an insertion position and a retracted position,
a biasing element arranged to bias the cannula to the retracted position, and
a blocking element arranged to:
block movement of the cannula from the insertion position to the retracted position, when the force exerted on the cannula in the direction perpendicular and/or the direction parallel to the insertion direction is below the first and/or second safety threshold value, respectively; and
allow movement of the cannula from the insertion position to the retracted position when the force exerted on the cannula in the direction perpendicular and/or the direction parallel to the insertion direction results in exceeding the first and/or second safety threshold value, respectively.

13. The cannula insertion system of claim 2, wherein the safety device comprises an adjustment mechanism to adjust the first and/or second safety threshold value.

14. The cannula insertion system of claim 1, wherein the cannula insertion system further comprises:
a positioning system supporting the cannula insertion device, and
a control device arranged to control the positioning system to position, based on a determined location for insertion of the cannula into the human or animal body, the cannula insertion device in a suitable position to insert the cannula into the human or animal body.

15. The cannula insertion system of claim 14, wherein the safety device comprises a sensor arranged to measure a signal representative of the force exerted on the cannula in a direction perpendicular to the insertion direction, and wherein the control device is arranged to control the positioning system and/or the cannula insertion device to retract the cannula in the retraction direction when the force exerted on the cannula in the direction perpendicular and/or the direction parallel to the insertion direction results in exceeding the first and/or second safety threshold value, respectively.

16. The cannula insertion system of claim 1, wherein the safety device is configured to retract the cannula or to release the cannula from the cannula insertion device when a power outage occurs.

17. The cannula insertion system of claim 1, wherein the cannula insertion system is an autonomous cannula insertion system constructed to autonomously insert the cannula into a blood vessel.

18. The cannula insertion system of claim 1, wherein the cannula is a needle.

19. The cannula insertion system of claim 1, wherein the cannula insertion system is constructed to autonomously draw blood from a blood vessel.

* * * * *